(12) United States Patent
Hsieh et al.

(10) Patent No.: US 11,736,637 B2
(45) Date of Patent: Aug. 22, 2023

(54) FOLDABLE STAND AND IMAGE FORMING APPARATUS WITH FOLDABLE STAND

(71) Applicant: Foxlink Image Technology Co., Ltd., New Taipei (TW)

(72) Inventors: Wei Pin Hsieh, New Taipei (TW); Lung Chen, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 163 days.

(21) Appl. No.: 17/522,981

(22) Filed: Nov. 10, 2021

(65) Prior Publication Data
US 2023/0009030 A1    Jan. 12, 2023

(30) Foreign Application Priority Data
Jul. 7, 2021    (CN) .......................... 202121538408.6

(51) Int. Cl.
   *H04N 1/00* (2006.01)
   *G06F 1/16* (2006.01)
   *B41J 29/02* (2006.01)
   *B41J 29/06* (2006.01)

(52) U.S. Cl.
   CPC ........ *H04N 1/00562* (2013.01); *B41J 29/023* (2013.01); *B41J 29/06* (2013.01); *G06F 1/1681* (2013.01)

(58) Field of Classification Search
   CPC ... B41J 13/00; B41J 15/04; B41J 29/02; B41J 29/06; B41J 3/36; G07B 1/00; G06F 1/1626; F16M 2200/08; A47G 1/143
   See application file for complete search history.

(56) References Cited

U.S. PATENT DOCUMENTS

| | | | | |
|---|---|---|---|---|
| 2,905,244 | A | * | 9/1959 | Sonnanstine, Jr. ...... G06K 1/00 234/124 |
| 3,141,398 | A | * | 7/1964 | Miller ..................... G03B 27/06 355/80 |
| 6,282,082 | B1 | * | 8/2001 | Armitage ............... G06F 1/1698 345/169 |
| 2004/0033834 | A1 | * | 2/2004 | Silverbrook ............ H04M 1/21 463/43 |
| 2005/0094227 | A1 | * | 5/2005 | Hwang .................. H04N 1/128 358/498 |
| 2006/0145046 | A1 | * | 7/2006 | Liou ....................... F16M 11/10 248/455 |
| 2007/0188818 | A1 | * | 8/2007 | Westcott ............ H04N 1/00583 358/296 |

(Continued)

*Primary Examiner* — John Zimmermann
(74) *Attorney, Agent, or Firm* — Lin & Associates Intellectual Property, Inc.

(57) ABSTRACT

An image forming apparatus includes a main body, a base, a holder and a connecting rod. The main body has a bottom surface, a top surface, a lower surface, a paper outlet and a paper inlet. The base has a bottom board being adjacent to the paper outlet, at least one vertical board being connected to the bottom board and being pivoted on the main body, and a first hinge being located at the bottom board. The holder has a beam, at least one support arm being connected to the beam, and a second hinge being located at the beam. The tip portion is higher than the vertical board. The connecting rod has opposite end portions being pivoted on the first hinge and the second hinge respectively. As described above, the occupying area is further reduced in an unused status.

20 Claims, 4 Drawing Sheets

(56) References Cited

U.S. PATENT DOCUMENTS

| | | | |
|---|---|---|---|
| 2010/0097667 A1* | 4/2010 | Ikeda | H04N 1/00535 |
| | | | 347/3 |
| 2019/0132464 A1* | 5/2019 | Miyauchi | H04N 1/00798 |
| 2021/0243316 A1* | 8/2021 | Tezuka | H04N 1/00551 |

* cited by examiner

FOLDABLE STAND AND IMAGE FORMING APPARATUS WITH FOLDABLE STAND

CROSS-REFERENCE TO RELATED APPLICATION

The present application is based on, and claims priority from, China Patent Application No. 202121538408.6, filed Jul. 7, 2021, the disclosure of which is hereby incorporated by reference herein in its entirety.

BACKGROUND OF THE INVENTION

1. Field of the Invention

The present invention generally relates to an image forming apparatus, and more particularly to a foldable stand of an image forming apparatus.

2. The Related Art

Referring to FIG. 1, in a conventional image forming apparatus 100' such as a printer or a scanner 100', in order to keep a paper inlet and a paper outlet of the image forming apparatus 100' unimpeded, so an occupying area of the image forming apparatus 100' lying on a table is large in used status. Furthermore, the forming apparatus 100' is without foldable structure to reduce the occupying area in unused status. Therefore, it is necessary to provide an innovative foldable stand used in an image forming apparatus, the image forming apparatus with the foldable stand has a small occupying area in unused status.

SUMMARY OF THE INVENTION

An object of the present invention is to provide an image forming apparatus. The image forming apparatus includes a main body, a base, a holder and a connecting rod. The main body has a bottom surface, a top surface, a lower surface being connected between the bottom surface and the top surface, a paper outlet being formed on the lower surface, a paper inlet being formed on the top surface. The base has a bottom board being adjacent to the paper outlet, at least one vertical board being connected to the bottom board and being pivoted on the main body, and a first hinge being located at the bottom board. The holder has a beam, at least one support arm being connected to the beam and having a tip portion being pivoted on the main body, and a second hinge being located at the beam. The tip portion is higher than the vertical board. The connecting rod has opposite end portions being pivoted on the first hinge and the second hinge respectively. In an unused status, the paper inlet and the paper outlet are aligned with each other along a vertical plane, the paper out let is impeded by the bottom board, the holder is adjacent to the bottom surface of the main body. In an used status, the paper inlet and the paper outlet are aligned with each other along an inclined plane, the paper outlet is unimpeded, the holder is rotated to far away from the bottom surface of the main body.

Another object of the present invention is to provide an image forming apparatus occupying a area of a supporting plane. The image forming apparatus includes a main body, a base, a holder and a connecting rod. The main body has a straightened bottom surface being defined in a bottom surface, a lower surface, a first inclined surface being defined in the bottom surface and being connected between the straightened bottom surface and the lower surface, and a paper outlet being formed on the lower surface. The base has a bottom board being adjacent to the paper outlet and being mounted on the supporting plane, at least one vertical board being connected to the bottom board and being extended into the main body through the first inclined surface to be pivoted on the main body, and a first hinge being located at the bottom board. The holder has a beam, at least one support arm being connected to the beam and having a tip portion, and a second hinge being located at the beam. The tip portion is extended into the main body through the straightened bottom surface to be pivoted on the main body. The connecting rod has opposite end portions being pivoted on the first hinge and the second hinge respectively. In an unused status, the occupying area is corresponding to the first inclined surface of the bottom surface and the lower surface of the main body. In an used status, the occupying area is corresponding to all the bottom surface and the lower surface of the main body.

As described above, the occupying area is further reduced in the unused status.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
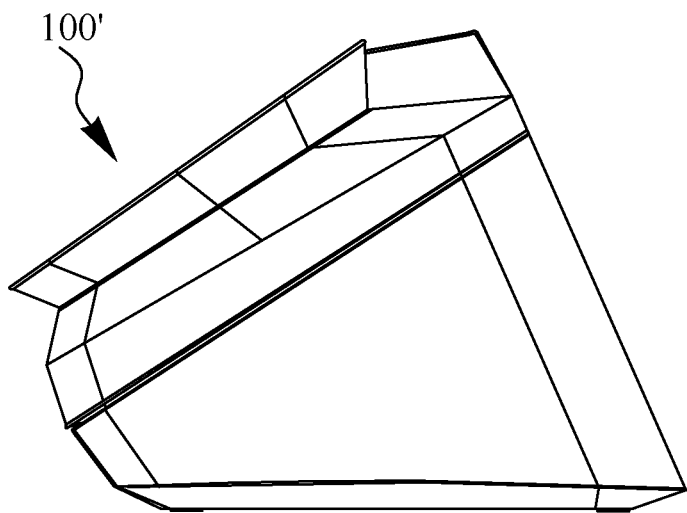
FIG. 1 is a perspective view of a conventional image forming apparatus.
Figure 2:
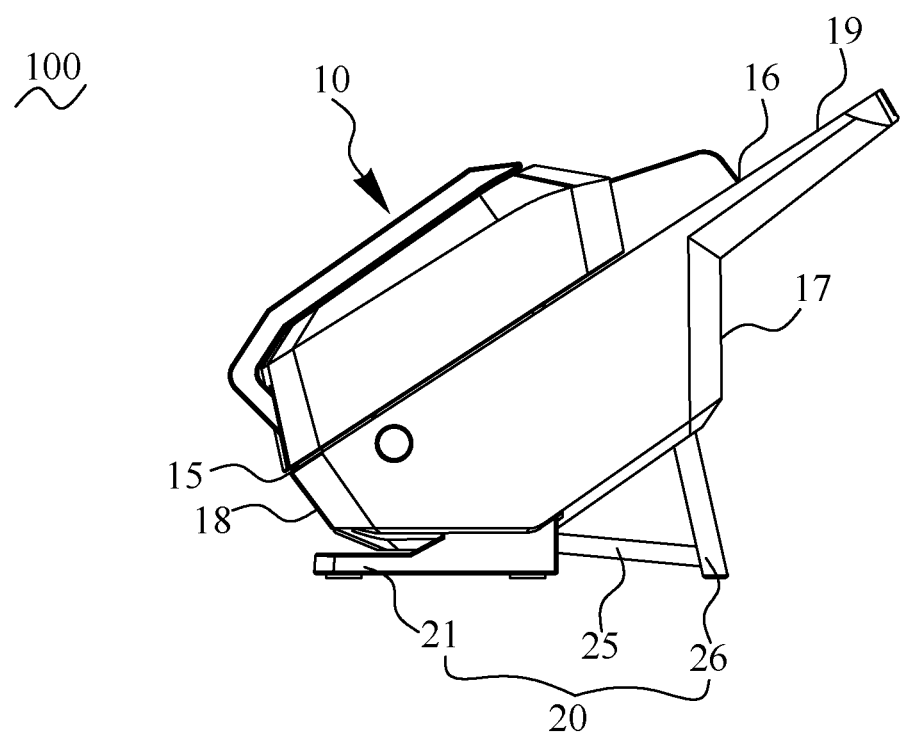
FIG. 2 is a perspective view showing an used status of an image forming apparatus with a foldable stand in accordance with a preferred embodiment of the present invention.
Figure 3:
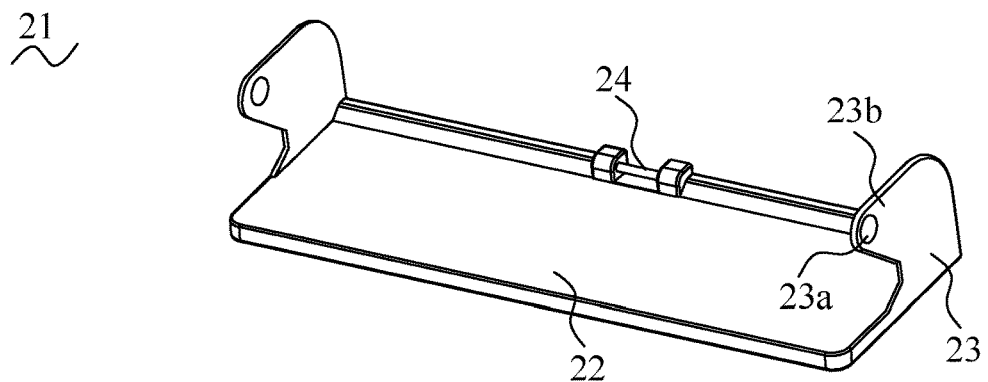
FIG. 3 is a perspective view of a base of the foldable stand in accordance with the preferred embodiment of the present invention.
Figure 4:
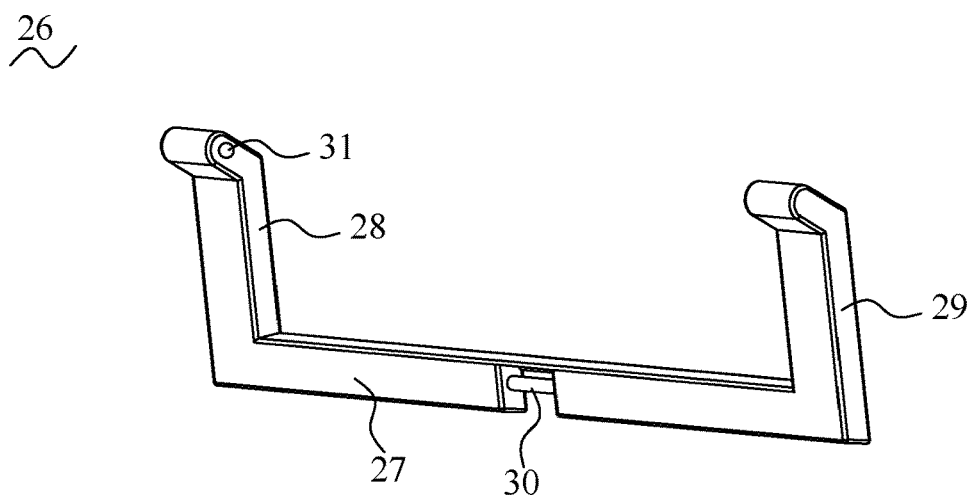
FIG. 4 is a perspective view of a holder of the foldable stand in accordance with the preferred embodiment of the present invention.
Figure 6:
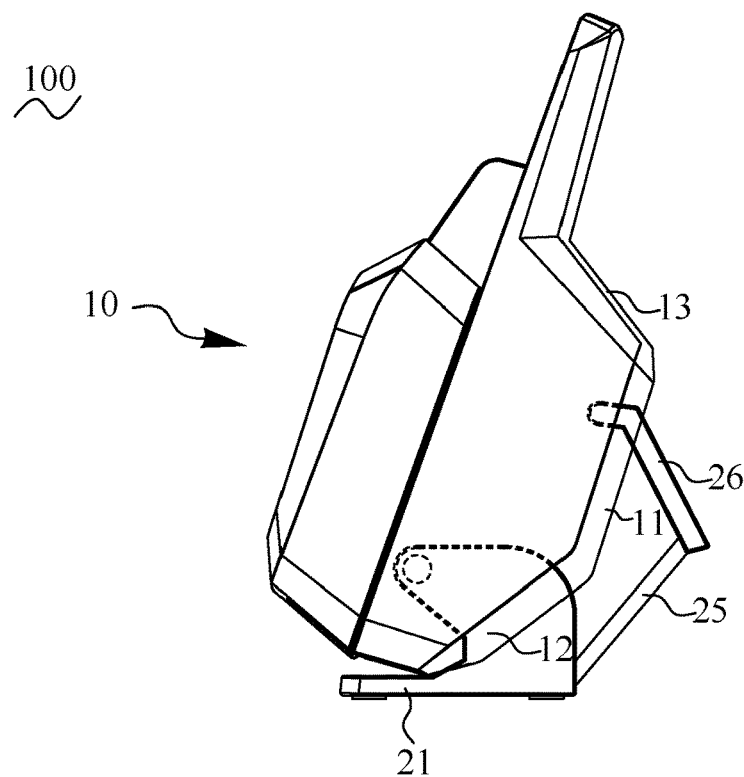
FIG. 6 is a perspective view showing a folding status of the image forming apparatus with the foldable stand in accordance with the preferred embodiment of the present invention.

With reference to FIG. 2 and FIG. 6, an image forming apparatus 100 with a foldable stand 20 in accordance with a preferred embodiment of the present invention is shown. In the preferred embodiment, the image forming apparatus 100, such as a printer or a scanner, includes an main body 10. A straightened bottom surface 11 is defined in a middle of a bottom surface 17 of the main body 10. A first inclined surface 12 extended obliquely downward from a lower side of the straightened bottom surface 11 is close to a paper outlet 15 of the main body 10. A second inclined surface 13 extended obliquely upward from an upper side of the straightened bottom surface 11 is close to a paper inlet 16 of the main body 10 and is far away from the paper outlet 15 of the main body 10. The paper outlet 15 is formed on a lower surface 18 of the main body 10. The paper inlet 16 is formed on a top surface 19 of the main body 10.

Figure 5:
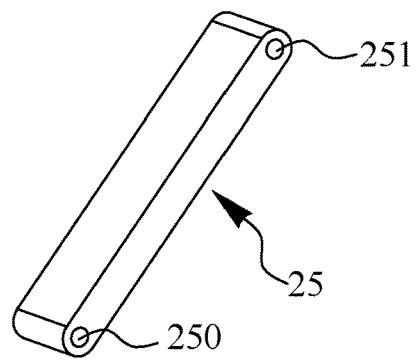
FIG. 5 is a perspective view of a connecting rod of the foldable stand in accordance with the preferred embodiment of the present invention.

With reference to FIG. 2 and FIG. 5, the foldable stand 20 has a base 21, a connecting rod 25 and a holder 26. The base 21 has a bottom board 22. Two vertical boards 23 are symmetrically located on two sides of a top of the bottom board 22. A first hinge 24 is located on a middle of a rear edge of the bottom board 22, which is far away from the paper outlet 15 of the main body 10. The connecting rod 25 has a lower hole 250 which is pivoted on the first hinge 24. The connecting rod 25 has an upper hole 251 which is pivoted on the holder 26. The holder 26 has a beam 27. A left support arm 28 and a right support arm 29 are symmetrically extended upward from two sides of the beam 27. A second hinge 30 is located in a middle of the beam 27. The upper hole 251 of the connecting rod 25 is pivoted on the second hinge 30.

Because the base 21 and the holder 26 are pivoted on the main body 10, and the main body 10 rotates under drive of the base 21 along a side of the connecting rod 25, the foldable stand 20 is in an extended status and the image forming apparatus 100 is in an used status. In the extended status, the paper outlet 15 is unimpeded. In the preferred embodiment, an extending portion 23b is extended toward the paper outlet 15 from each of a top of the vertical boards 23. A front end of the extending portion 23b has a fixing hole 23a. Each of the fixing holes 23a is pivoted on two sides of the main body 10. The beam 27, the left support arm 28 and the right support arm 29 are integrally formed with each other. Each of the left support arm 28 and the right support arm 29 is an inverted L shape. Each of short portions of the left support arm 28 and the right support arm 29 has a hinging hole 31. Each of the hinging holes 31 is pivoted on two sides of the main body 10. The fixing holes 23a are pivoted on two sides of a lower portion of the main body 10, the lower portion of the main body 10 is close to the paper outlet 15. The hinging holes 31 are pivoted on two sides of an upper portion of the main body 10, the upper portion of the main body 10 is close to the paper inlet 16.

With reference to FIG. 6, in order to improve stability of the foldable stand 20 in an folded status, in the preferred embodiment, each of the extending portions 23b is extended into two sides of the main body 10 from the first inclined surface 12. Each of the short portions of the left support arm 28 and the right support arm 29 is extended into two sides of the main body 10 from the straightened bottom surface 11 and is close to the second inclined surface 13. The length of the first inclined surface 12 is longer than the length of the second inclined surface 13. The slope angle between the first inclined surface 12 and the straightened bottom surface 11 is smaller than the slope angle between the second inclined surface 13 and the straightened bottom surface 11.

Figure 7:
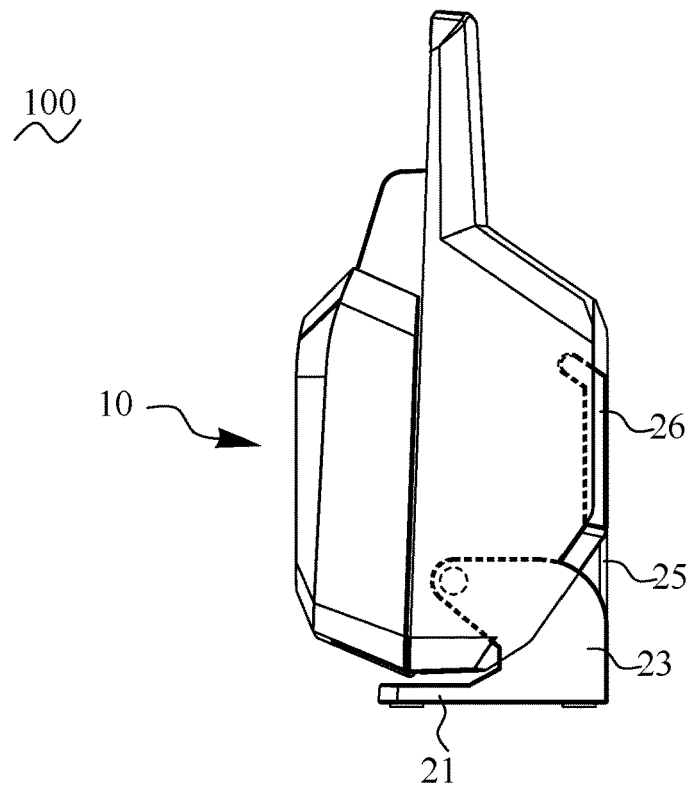
FIG. 7 is a perspective view showing an unused status of the image forming apparatus with the foldable stand in accordance with the preferred embodiment of the present invention.

With reference to FIG. 6 and FIG. 7, by adjusting relation positions among the base 21, the holder 26 and the connecting rod 25 of the foldable stand 20, the image forming apparatus 100 is simultaneously moved in the used status or an unused status. When the foldable stand 20 is in the folded status and the image forming apparatus 100 is in the unused status, the holder 26 is adjacent to the straightened bottom surface 11, and the connecting rod 25 and a long portion of each of the left support arm 28 and the left support arm 29 are position on the same plane. Therefore, the bottom board 22 is perpendicular to the connecting rod 25 and the long portions of support arm 28, 29. The image forming apparatus 100 is mounted on a table (not shown) through the bottom board 22 of the base 21. The paper outlet 15 and the paper inlet 16 are aligned with each other along a inclined plane, and the paper outlet 25 is impeded by the bottom board 22 of the base 21. In the preferred embodiment, the holder 26 is received in a receiving groove 14 formed on the straightened bottom surface 11. When the foldable stand 20 is in the extended status and the forming apparatus 100 is in the used status, the holder 26 is rotated to being far away from the straightened bottom surface 11, and the connecting rod 25 is rotated to form an angle between the connecting rod 25 and the holder 26. The connecting rod 25 is substantially parallel with the bottom board 22 of the base 21. The beam 27 of the holder 26 is substantially aligned with the second inclined surface 13 along a vertical plane. Therefore, the image forming apparatus 100 is mounted on the table through the bottom board 22 of the base 21 and the beam 27 of the holder 26. The paper outlet 15 and the paper inlet 16 are aligned with each other along an inclined plane, and the paper outlet 15 is unimpeded by the bottom board 22 of the base 21.

Figure 8:
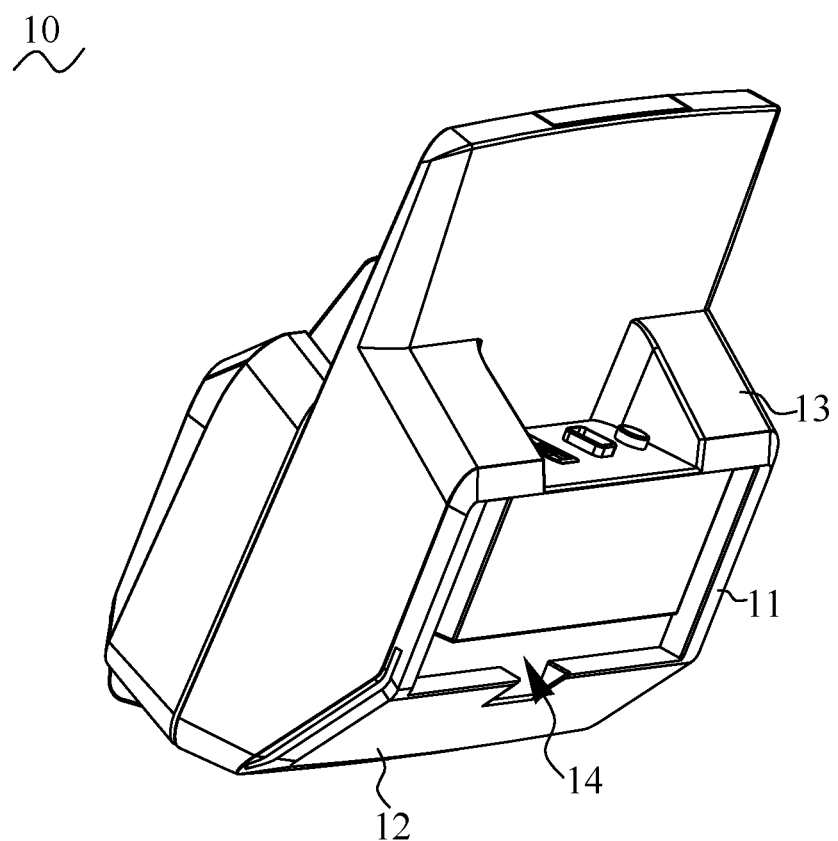
FIG. 8 is a perspective view of the image forming apparatus without the foldable stand in accordance with the preferred embodiment of the present invention.

With reference to FIG. 2 and FIG. 7-8, an occupying area of mounting the image forming apparatus 100 is corresponding to the lower surface 18 and all the bottom surface 17 of the main body 10 in the used status, which is large. The occupying area of mounting the image forming apparatus 100 is corresponding to the lower surface 18 and the first inclined surface 12 of the bottom surface 17 of the main body 10 in unused status, which is small. Therefore, the occupying area is further reduced in unused status.

What is claimed is:

1. An image forming apparatus, comprising:
   a main body having a bottom surface, a top surface, a lower surface being connected between the bottom surface and the top surface, a paper outlet being formed on the lower surface, a paper inlet being formed on the top surface;
   a base having
      a bottom board being adjacent to the paper outlet,
      at least one vertical board being connected to the bottom board and being pivoted on the main body, and
      a first hinge being located at the bottom board;
   a holder having
      a beam,
      at least one support arm being connected to the beam and having a tip portion being pivoted on the main body, the tip portion being higher than the vertical board, and
      a second hinge being located at the beam; and
   a connecting rod having opposite end portions being pivoted on the first hinge and the second hinge respectively;
   wherein, in an unused status, the paper inlet and the paper outlet are aligned with each other along a vertical plane, the paper out let is impeded by the bottom board, the holder is adjacent to the bottom surface of the main body;
   wherein, in an used status, the paper inlet and the paper outlet are aligned with each other along an inclined plane, the paper outlet is unimpeded, the holder is rotated to far away from the bottom surface of the main body.

2. The image forming apparatus as claimed in claim 1, wherein the holder has a left support arm and a right support arm, the beam, the left support arm and the right support arm are integrally formed with each other, each of the left support arm and the right support arm is a inverted L shape, and each of short portions of the left support arm and the right support arm has a hinge hole, the hinging holes are pivoted on two sides of the main body.

3. The image forming apparatus as claimed in claim 1, wherein the base has two vertical boards, the vertical boards are symmetrically located on two sides of a top of the bottom board and are far away from the paper outlet, an extending portion is extended toward the paper outlet from each of tops of the vertical boards, a fixing hole is located on a front end of the extending portion, and the fixing holes are pivoted on two sides of the main body.

4. The image forming apparatus as claimed in claim 2, wherein the base has two vertical boards, the vertical boards are symmetrically located on two sides of a top of the bottom board and are far away from the paper outlet, an extending portion is extended toward the paper outlet from each of tops of the vertical boards, a fixing hole is located on a front end of the extending portion, and the fixing holes are pivoted on two sides of the main body.

5. The image forming apparatus as claimed in claim 1, wherein a straightened bottom surface is defined in a middle of the bottom surface of the main body, and a first inclined surface extended from a lower side of the straightened bottom surface is close to the paper outlet, a second inclined surface extended from an upper side of the straightened bottom surface is far away from the paper outlet.

6. The image forming apparatus as claimed in claim 2, wherein a straightened bottom surface is defined in a middle of the bottom surface of the main body, and a first inclined surface extended from a lower side of the straightened bottom surface is close to the paper outlet, a second inclined surface extended from an upper side of the straightened bottom surface is far away from the paper outlet.

7. The image forming apparatus as claimed in claim 3, wherein a straightened bottom surface is defined in a middle of the bottom surface of the main body, and a first inclined surface extended from a lower side of the straightened bottom surface is close to the paper outlet, a second inclined surface extended from an upper side of the straightened bottom surface is far away from the paper outlet.

8. The image forming apparatus as claimed in claim 4, wherein a straightened bottom surface is defined in a middle of the bottom surface of the main body, and a first inclined surface extended from a lower side of the straightened bottom surface is close to the paper outlet, a second inclined surface extended from an upper side of the straightened bottom surface is far away from the paper outlet, the vertical boards are extended into the main body from the first inclined surface, the left support arm and the right support arm are extended into the main body from the straightened bottom surface close to the second inclined surface.

9. The image forming apparatus as claimed in claim 5, wherein a length of the first inclined surface is longer than a length of the second inclined surface, and a slope angle between the first inclined surface and the straightened bottom surface is smaller than a slope angle between the second inclined surface and the straightened bottom surface.

10. The image forming apparatus as claimed in claim 6, wherein a length of the first inclined surface is longer than a length of the second inclined surface, and a slope angle between the first inclined surface and the straightened bottom surface is smaller than a slope angle between the second inclined surface and the straightened bottom surface.

11. The image forming apparatus as claimed in claim 7, wherein a length of the first inclined surface is longer than a length of the second inclined surface, and a slope angle between the first inclined surface and the straightened bottom surface is smaller than a slope angle between the second inclined surface and the straightened bottom surface.

12. The image forming apparatus as claimed in claim 8, wherein a length of the first inclined surface is longer than a length of the second inclined surface, and a slope angle between the first inclined surface and the straightened bottom surface is smaller than a slope angle between the second inclined surface and the straightened bottom surface.

13. The image forming apparatus as claimed in claim 5, wherein a receiving groove is formed on the straightened bottom surface.

14. The image forming apparatus as claimed in claim 6, wherein a receiving groove is formed on the straightened bottom surface.

15. The image forming apparatus as claimed in claim 7, wherein a receiving groove is formed on the straightened bottom surface.

16. The image forming apparatus as claimed in claim 8, wherein a receiving groove is formed on the straightened bottom surface.

17. The image forming apparatus as claimed in claim 9, wherein a receiving groove is formed on the straightened bottom surface.

18. The image forming apparatus as claimed in claim 10, wherein a receiving groove is formed on the straightened bottom surface.

19. The image forming apparatus as claimed in claim 12, wherein a receiving groove is formed on the straightened bottom surface.

20. An image forming apparatus occupying a area of a supporting plane, comprising:
    a main body having
        a straightened bottom surface being defined in a bottom surface,
        a lower surface,
        a first inclined surface being defined in the bottom surface and being connected between the straightened bottom surface and the lower surface, and
        a paper outlet being formed on the lower surface;
    a base having
        a bottom board being adjacent to the paper outlet and being mounted on the supporting plane,
        at least one vertical board being connected to the bottom board and being extended into the main body through the first inclined surface to be pivoted on the main body, and
        a first hinge being located at the bottom board;
    a holder having
        a beam,
        at least one support arm being connected to the beam and having a tip portion being, the tip portion being extended into the main body through the straightened bottom surface to be pivoted on the main body, and
        a second hinge being located at the beam; and
    a connecting rod having opposite end portions being pivoted on the first hinge and the second hinge respectively;
    wherein, in an unused status, the occupying area is corresponding to the first inclined surface of the bottom surface and the lower surface of the main body;
    wherein, in an used status, the occupying area is corresponding to all the bottom surface and the lower surface of the main body.

* * * * *